United States Patent [19]

Weissflog et al.

[11] 4,099,856
[45] Jul. 11, 1978

[54] NEMATIC LIQUID CRYSTALLINE SUBSTANCES

[75] Inventors: Wolfgang Weissflog, Halle-Neustadt; Hermann Schubert, Nehlitz; Horst Kresse, Halle; Adalbert Wiegeleben, Halle; Dietrich Demus, Halle, all of German Democratic Rep.

[73] Assignee: VEB Werk für Fernsehelektronik, Berlin-Oberschoneweide, German Democratic Rep.

[21] Appl. No.: 381,324

[22] Filed: Jul. 20, 1973

[30] Foreign Application Priority Data

Oct. 5, 1972 [DD] German Democratic Rep. ... 166044
Nov. 23, 1972 [DD] German Democratic Rep. ... 167034
Nov. 23, 1972 [DD] German Democratic Rep. ... 167033

[51] Int. Cl.² ............................. C09K 3/34; G02F 1/13
[52] U.S. Cl. ................................. 350/350; 23/230 LC; 252/299; 260/463; 560/67
[58] Field of Search ........................ 252/299, 408 LC; 350/160 LC; 23/230 LC; 260/463, 473 R, 469

[56] References Cited

PUBLICATIONS

"Liquid Crystals, II, Unsymmetrical p-Phenylene Di--p-n-Alkoxy-Benzoates," S. Haut, D. Schroeder, and J. Schroeder, J. Org. Chem. vol. 37, No. 9, 1972, pp. 1425–1428.

"Molecular Structure and Liquid Crystallinity, Phenylene Bis (Alkoxybenzoates)," S. Arora, J. Fergason, T. Taylor, J. Org. Chem., vol. 35, No. 12 (1970), pp. 4055–4058.

Arora, S. L., et al., Molecular Crystals and Liquid Crystals, vol. 10, pp. 243–257 (1970).

Kast, Landolt-Bornstein, vol. II, part 2a, 6th ed., Springer-Verlag, Berlin, pp. 266–267, 295 (1960).

Primary Examiner—Benjamin R. Padgett
Assistant Examiner—T. S. Gron
Attorney, Agent, or Firm—Nolte and Nolte

[57] ABSTRACT

As the liquid crystal substance in electro-optical devices or as the stationary phase in gas chromatography is employed a compound of the formula

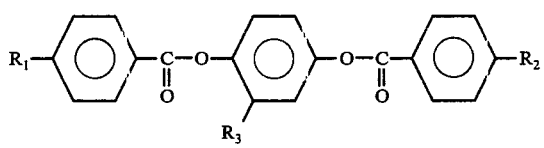

in which $R_1$ and $R_2$ each is $C_nH_{2n+1}-$, $C_nH_{2n+1}O-$, $C_nH_{2n+1}COO-$ or $C_nH_{2n+1}OCOO-$, $n$ being an integer of from 1 to 10, and $R_3$ is $Cl-$, $Br-$, $CH_3-$, $C_2H_5-$, $CH_3CO-$ or $CH_3OOC-$.

27 Claims, 1 Drawing Figure

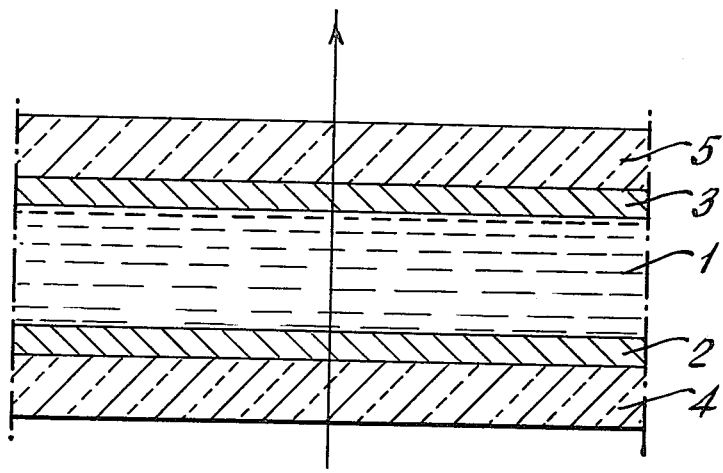

NEMATIC LIQUID CRYSTALLINE SUBSTANCES

This invention relates to the use of liquid crystalline substances in systems comprising means for generating an electric or magnetic field and means for retaining the liquid crystalline substances in the field, particularly electro-optical devices for the modulation of transmitted or incident light and for the reproduction of numbers, symbols and images, and as the stationary phase in gas chromatography systems.

It is known that certain substances exhibit in the nematic liquid crystalline state a dynamic scattering effect, viz., when applying a d-c or an a-c voltage the nematic liquids exhibit a light dispersion dependent on the applied voltage. This light scattering attenuates the transmitted light, but is perceived as a brightening when observing the light dispersed back. For this reason, nematic liquids which exhibit the dynamic scattering effect have been proposed for the production of electro-optical components.

Some of the substances used heretofore possess a disturbing inherent coloration, other substances are not very stable to chemical influence, air, heat and electric fields. There are some substances which, while having a low melting point also have a low clarification point and hence a small range in which the nematic state exists. Some substances exhibit only a weak dynamic scattering effect, so that the electro-optical components produced with them attain only slight contrasts.

It is an object of the invention to use colorless, stable, low melting nematic crystalline liquids having high clarification points and strong dynamic scattering in electro-optical arrangements and as the stationary phase in gas chromatography.

It has been found that derivatives of 2-substituted hydroquinone of the general formula

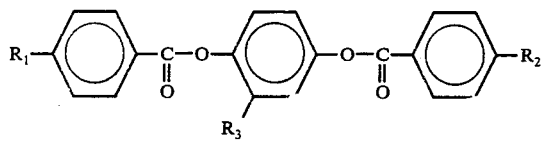

($R_1$ and $R_2$ each is a substituent such as $C_nH_{2n+1}-$, $C_nH_{2n+1}O-$, $C_nH_{2n+1}COO-$ or $C_nH_{2n+1}OCOO-$, in which the integer $n = 1$ to 10; $R_3$ is a substituent such as Cl—, Br—, $CH_3-$, $C_2H_5-$, $CH_3CO-$, $CH_3OOC-$) can be used in electro-optical arrangements on the basis of the dynamic scattering effect for the modulation of transmitted or incident light and as the stationary phase in gas chromatography.

The 2-substituted hyroquinone derivatives are produced in pyridine by acylation with the bimolar quantity of the respective benzoyl chloride derivative.

The production of the compounds having side groups identical on both sides ($R_1=R_2$) occurs according to the scheme:

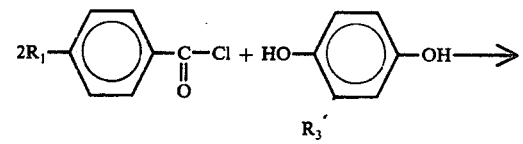

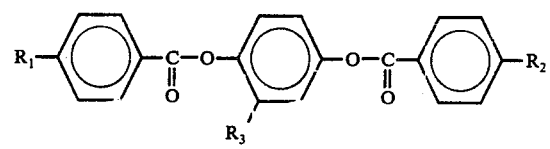

The compounds having non-identical side groups ($R_1 \neq R_2$) are produced by different methods:

(a) Reaction of a mono-4-substituted-benzoyl-2-substituted-hydroquinone with a different 4-substituted-benzoyl chloride according to the scheme:

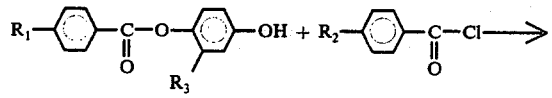

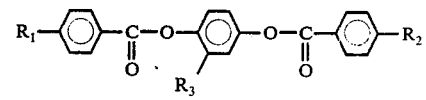

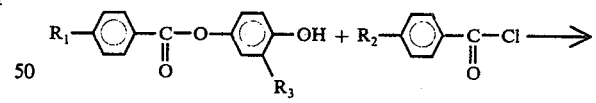

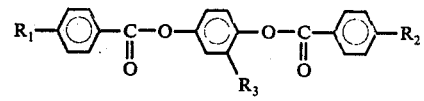

(b) Reaction of 2-substituted-hydroquinone with a 4-substituted-benzoyl chloride to a mixture of the two possible isomeric mono-(4-substituted-benzoyl)-2-substituted-hydroquinones and reaction of this mixture with a different 4-substituted-benzoyl chloride to the mixture of the two possible isomeric 2-substituted-hydroquinone diesters according to the scheme:

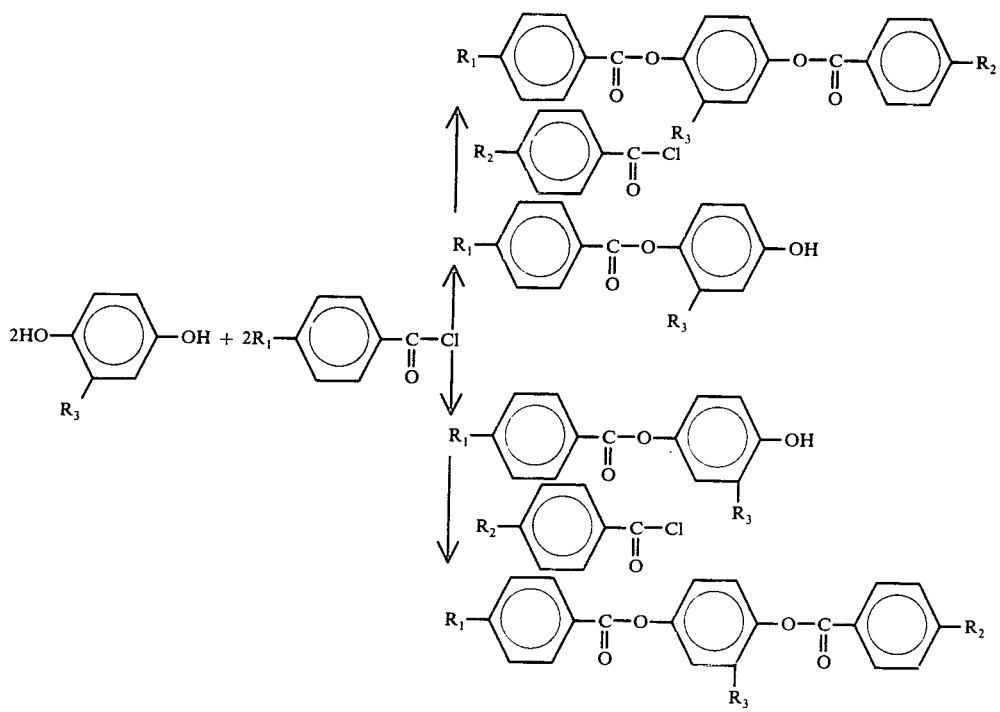

(c) Simultaneous esterification of the two hydroxyl groups of the 2-substituted-hydroquinone with two or more differently 4-substituted-benzoyl chlorides to a mixture of the respective possible isomeric 2-substituted-hydroquinone-diesters. The benzoyl chloride derivatives may be used in equal or different molar quantity ratios relative to each other.

The substances and mixtures according to the invention are miscible among themselves and with other liquid crystalline compounds, as for example 4-n-pentyloxybenzoyl-4'-octyloxyphenol, 4-methoxy-4'-caproyloxyazobenzene, and non-liquid crystalline compounds, as for example, diphenyl, azobenzene, octadecanol, methyl red. By the production of such mixtures the melting points can be considerably further lowered.

The substances according to the invention are suitable in the nematic state as stationary phase for gas chromatography. Thus it is possible, for example, to separate mixtures of isomers of substituted benzene, such as m-xylene and p-xylene.

The advantages of the substances according to the invention consist in their lack of color, their stability toward chemical influences such as water or air, and against action of light, their stability up to temperatures above 150° C as well as toward d-c and a-c fields. Further advantages are the relatively low melting temperatures and the comparatively high clarification temperatures, owing to which the ranges of the nematic state are large. The pure and mixed substances exhibit the dynamic dispersion effect in pronounced form and thus permit the construction of very high contrast electro-optical components.

The invention will be further explained below with reference to the following examples and in conjunction with the drawing (a simplified cross-section of an electro-optical cell) which are intended to illustrate but not to limit the scope of the invention:

EXAMPLE 1

Production of compounds of the invention having side groups identical on both sides ($R_1=R_2$); for example, $R_1$ and $R_2$ each is $C_6H_{13}O-$ and $R_3$ is Cl.

0.02 mole of 4-substituted benzoyl chloride is dissolved in 20 ml. of dry pyridine and dropped into 0.01 mole of the hydroquinone derivative in 50 ml. of dry pyridine while stirring and cooling with ice. The product is left standing overnight at room temperature, then heated for 5 minutes in the waterbath, and after cooling the reaction solution is permitted to flow into a mixture of ice and concentrated hydrochloric acid. The precipitate is suction filtered, washed with dilute hydrochloric acid and water, and recrystallized. As solvent are suitable, for example, ethanol, isopropanol or n-hexane. Yields are between 60 and 70% of the theory.

EXAMPLE 2

Production of compounds having side groups unequal on both sides ($R_1 \neq R_2$):

0.01 mole each of 4-n propylbenzoyl chloride and 4-n hexylbenzoyl chloride are dissolved in 10 ml. of dry pyridine and added to 0.01 mole of 2-ethyl hydroquinone in 50 ml. of dry pyridine while cooling with ice and stirring. After being permitted to stand for a while and then being heated briefly to 50° C, the solution is poured after cooling into a mixture of ice and concentrated hydrochloric acid, the desired compound separating in the nematic state. The compound melts from −10° to +8° C to a nematic liquid which can be supercooled to −80° C for many hours. Between +70° and +80° C the mixture is transformed into an isotropic liquid. In the nematic state the mixture exhibits a very good dynamic scattering effect with a contrast of 6:1. By comparison, azoxyanisol exhibits a contrast of 4:1.

EXAMPLE 3

In Table 1 are given examples for the melting and clarification points of the nematic substances according to the invention of the general formula

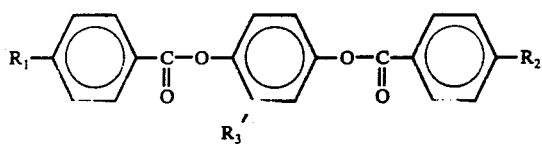

| No. | $R_1 = R_2$ | $R_3$ | Melting Point (° C) | Clear Point (° C) |
|---|---|---|---|---|
| 1 | $C_6H_{13}O-$ | Cl | 85 | 179 |
| 2 | $C_8H_{17}O-$ | Cl | 89 | 161 |
| 3 | $C_5H_{11}-$ | Cl | 79 | 145 |
| 4 | $C_7H_{15}-$ | Cl | 79 | 124 |
| 5 | $C_4H_9COO-$ | Cl | 124 | 220 |
| 6 | $C_5H_{11}COO-$ | Cl | 117 | 208 |
| 7 | $C_5H_{11}OCOO$ | Cl | 82 | 185 |
| 8 | $C_8H_{17}OCOO$ | Cl | 76 | 157 |
| 9 | $C_6H_{13}O-$ | Br | 97 | 163 |
| 10 | $C_8H_{17}O-$ | Br | 95 | 140 |
| 11 | $C_5H_{11}-$ | Br | 76 | 134 |
| 12 | $C_7H_{15}-$ | Br | 82 | 113 |
| 13 | $C_4H_9COO-$ | Br | 121 | 214 |
| 14 | $C_5H_{11}COO-$ | Br | 119 | 202 |
| 15 | $C_6H_{13}O-$ | $CH_3$ | 85 | 178 |
| 16 | $C_8H_{17}O-$ | $CH_3$ | 72 | 153 |
| 17 | $C_5H_{11}-$ | $CH_3$ | 78 | 146 |
| 18 | $C_7H_{15}-$ | $CH_3$ | 79 | 122 |
| 19 | $C_4H_9COO-$ | $CH_3$ | 126 | 217 |
| 20 | $C_5H_{11}COO-$ | $CH_3$ | 100 | 209 |
| 21 | $C_5H_{11}OCOO$ | $CH_3$ | 83 | 190 |
| 22 | $C_8H_{17}OCOO$ | $CH_3$ | 82 | 161 |
| 23 | $C_6H_{13}O-$ | $C_2H_5$ | 60 | 132 |
| 24 | $C_8H_{17}O-$ | $C_2H_5$ | 62 | 119 |
| 25 | $C_3H_7-$ | $C_2H_5$ | 57 | 118 |
| 26 | $C_4H_9-$ | $C_2H_5$ | 52 | 91 |
| 27 | $C_5H_{11}-$ | $C_2H_5$ | 63 | 100 |
| 28 | $C_6H_{13}-$ | $C_2H_5$ | 44 | 80 |
| 29 | $C_7H_{15}-$ | $C_2H_5$ | 51 | 90 |
| 30 | $C_4H_9COO-$ | $C_2H_5$ | 82 | 172 |
| 31 | $C_5H_{11}COO-$ | $C_2H_5$ | 72 | 162 |
| 32 | $C_6H_{13}O-$ | $CH_3CO-$ | 102 | 135 |
| 33 | $C_7H_{15}-$ | $CH_3CO-$ | 70 | 90 |
| 34 | $C_6H_{13}O-$ | $CH_3OOC-$ | 98 | 139 |
| 35 | $C_7H_{15}-$ | $CH_3OOC-$ | 81 | 87 |
| 36 | $C_4H_9COO$ | $CH_3OOC-$ | 98 | 166 |

EXAMPLE 4

Examples of mixtures of the substances according to the invention are listed in Table 2.

Table 2

| Substance No. | % by weight | Melting Point (° C) | Clear Point (° C) |
|---|---|---|---|
| 24 | 50 | 44–48 | 107 |
| 27 | 50 | | |
| 30 | 60 | | |
| 30 | 40 | 59 | 168 |

EXAMPLE 5

Examples of mixtures of substances according to the invention with additional liquid crystalline substances are contained in Table 3.

Table 3

| Substance | % by weight | Melting Point (° C) | Clear Point (° C) |
|---|---|---|---|
| No. 29 $C_5H_{11}O-\bigcirc-COO-\bigcirc-OC_8H_{17}$ | 50 | 36–40 | 75 |
| No. 29 $CH_3O-\bigcirc-COO-\bigcirc-OC_6H_{13}$ | 50 | | |
| $C_4H_9O-\bigcirc-COO-\bigcirc-OC_6H_{13}$ | 20.0 19.0 | | |
| $C_5H_{11}O-\bigcirc-COO-\bigcirc-OC_8H_{17}$ | 23.1 37.9 | 5–8 | 79 |

The compounds according to the invention as well as mixtures thereof with one another and with other liquid crystalline or non-liquid crystalline substances are applicable in electro-optical cells of the construction illustrated in the drawing, for example.

The cell is comprised of the liquid crystal layer 1, the thickness of which is preferably 10 to 100 microns, and the two glass plates 4 and 5 which carry transparent electrically conductive electrodes 2 and 3, preferably consisting of tin dioxide. The light passes through the cell in the indicated direction. If a d-c or a-c voltage is applied to the electrodes, there begins to form above a threshold voltage a light-dispersing state of the liquid crystal layer and the intensity of the transmitted light is attenuated. The ratio of the transparencies of the layer without and with electric field reaches values of 20:1 and higher when, for example, a d-c voltage of 50 v. is applied.

If the transparent electrically conducting electrodes have the form of a certain symbol, this symbol can be reproduced on the arrangement. With the use of 7-segment electrodes, for example, all numbers from 0 to 9 can be reproduced. If narrow parallel strips electrically insulated from each other are used as electrodes, the directions of the strips of the front and rear electrodes forming an angle of 90°, the layer can be actuated point by point, permitting the reproduction of any symbol, number or image.

If the rear electrode 3 is made not of transparent material but of vapor-deposited reflecting metal, e.g., aluminum, silver, chromium, gold or platinum, the cell can be operated under incident light. By application of a voltage, the light scattering effect of the layer is increased and brightening results. The ratio of the intensity of the dispersed light without and with an electric field can reach values of 1:20 and greater at an applied d-c voltage of 50 V. If the electrodes are in the forms mentioned hereinabove, any symbols, numbers and images can be produced also with this incident light embodiment.

What is claimed is:

1. In a system comprising means for generating an electric or magnetic field and a composition comprising at least one nematic liquid crystalline compound retained in the field, the improvement in which at least one of the nematic liquid crystalline compounds is

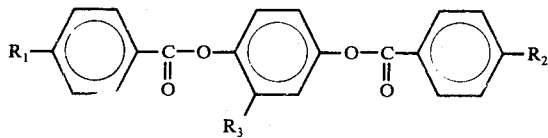

in which $R_1$ and $R_2$ each is $C_nH_{2n+1}-$ or $C_nH_{2n+1}COO-$, $n$ being an integer of from 1 to 10, and $R_3$ is $Cl-$, $Br-$, $CH_3-$, $C_2H_5-$, $CH_3CO-$ or $CH_3OOC-$.

2. In a system according to claim 1, in the improvement in which $R_1$ and $R_2$ each is $C_5H_{11}-$ and $R_3$ is Cl.

3. In a system according to claim 1, in the improvement in which $R_1$ and $R_2$ each is $C_7H_{15}-$ and $R_3$ is Cl.

4. In a system according to claim 1, in the improvement in which $R_1$ and $R_2$ each is $C_4H_9COO-$ and $R_3$ is Cl.

5. In a system according to claim 1, in the improvement in which $R_1$ and $R_2$ each is $C_5H_{11}COO-$ and $R_3$ is Cl.

6. In a system according to claim 1, in the improvement in which $R_1$ and $R_2$ each is $C_5H_{11}-$ and $R_3$ is Br.

7. In a system according to claim 1, in the improvement in which $R_1$ and $R_2$ each is $C_7H_{15}-$ and $R_3$ is Br.

8. In a system according to claim 1, in the improvement in which $R_1$ and $R_2$ each is $C_4H_9COO-$ and $R_3$ is Br.

9. In a system according to claim 1, in the improvement in which $R_1$ and $R_2$ each is $C_5H_{11}COO-$ and $R_3$ is Br.

10. In a system according to claim 1, in the improvement in which $R_1$ and $R_2$ each is $C_3H_7-$ and $R_3$ is $C_2H_5$.

11. In a system according to claim 1, in the improvement in which $R_1$ and $R_2$ each is $C_4H_9-$ and $R_3$ is $C_2H_5$.

12. In a system according to claim 1, in the improvement in which $R_1$ and $R_2$ each is $C_5H_{11}-$ and $R_3$ is $C_2H_5$.

13. In a system according to claim 1, in the improvement in which $R_1$ and $R_2$ each is $C_6H_{13}-$ and $R_3$ is $C_2H_5$.

14. In a system according to claim 1, in the improvement in which $R_1$ and $R_2$ each is $C_7H_{15}-$ and $R_3$ is $C_2H_5$.

15. In a system according to claim 1, in the improvement in which $R_1$ and $R_2$ each is $C_4H_9COO-$ and $R_3$ is $C_2H_5$.

16. In a system according to claim 1, in the improvement in which $R_1$ and $R_2$ each is $C_5H_{11}COO-$ and $R_3$ is $C_2H_5$.

17. In a system according to claim 1, in the improvement in which $R_1$ and $R_2$ each is $C_7H_{15}-$ and $R_3$ is $CH_3CO-$.

18. In a system according to claim 1, in the improvement in which $R_1$ and $R_2$ each is $C_7H_{15}-$ and $R_3$ is $CH_3OOC-$.

19. In a system according to claim 1, in the improvement in which $R_1$ and $R_2$ each is $C_4H_9COO$ and $R_3$ is $CH_3OOC-$.

20. In a system according to claim 1, in the improvement in which $R_1$ is $C_3H_7-$, $R_2$ is $C_6H_{13}-$ and $R_3$ is $C_2H_5-$.

21. In a system according to claim 1, in the improvement in which $R_1$ and $R_2$ each is $C_5H_{11}-$ and $R_3$ is $CH_3$.

22. In a system according to claim 1, in the improvement in which $R_1$ and $R_2$ each is $C_7H_{15}-$ and $R_3$ is $CH_3$.

23. In a system according to claim 1, in the improvement in which $R_1$ and $R_2$ each is $C_4H_9COO-$ and $R_3$ is $CH_3$.

24. In a system according to claim 1, in the improvement in which $R_1$ and $R_2$ each is $C_5H_{11}COO-$ and $R_3$ is $CH_3$.

25. In a system comprising means for generating an electric or magnetic field and a composition comprising at least one nematic liquid crystalline compound retained in the field, the improvement in which at least one of the nematic liquid crystalline compounds is

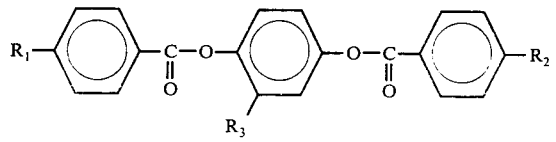

in which $R_1$ and $R_2$ each is $C_nH_{2n+1}O-$, $n$ being an integer of from 1 to 10, and $R_3$ is $CH_3CO-$ or $CH_3OOC-$.

26. In a system according to claim 25, in the improvement in which $R_1$ and $R_2$ each is $C_6H_{13}O-$ and $R_3$ is $CH_3CO-$.

27. In a system according to claim 25, in the improvement in which $R_1$ and $R_2$ each is $C_6H_{13}O-$ and $R_3$ is $CH_3OOC-$.

* * * * *